US012798480B2

(12) United States Patent
Wang et al.

(10) Patent No.: US 12,798,480 B2
(45) Date of Patent: Nov. 17, 2026

(54) ACTIVE DRIVING SOUND EFFECT GENERATOR

(71) Applicant: HONDA MOTOR CO., LTD., Tokyo (JP)

(72) Inventors: Xun Wang, Wako (JP); Toshio Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 129 days.

(21) Appl. No.: 19/047,050

(22) Filed: Feb. 6, 2025

(65) Prior Publication Data

US 2025/0256647 A1 Aug. 14, 2025

(30) Foreign Application Priority Data

Feb. 8, 2024 (JP) ................................ 2024-017714

(51) Int. Cl.

*G10K 15/02* (2006.01)
*B60G 9/00* (2006.01)

(52) U.S. Cl.

CPC ............... *B60G 9/00* (2013.01); *G10K 15/02* (2013.01)

(58) Field of Classification Search

CPC .................................. B60Q 9/00; G10K 15/02
USPC ............................................................ 381/86
See application file for complete search history.

(56) References Cited

U.S. PATENT DOCUMENTS

| | | | | |
|---|---|---|---|---|
| 5,129,004 A * | 7/1992 | Imai | H04S 1/002 | 381/86 |
| 7,561,706 B2 * | 7/2009 | Holmi | H04S 3/002 | 381/86 |
| 8,472,638 B2 * | 6/2013 | Furge | H03G 3/32 | 381/20 |
| 10,699,692 B2 * | 6/2020 | Wang | H04R 29/001 | |
| 2003/0086577 A1 * | 5/2003 | Lee | H04S 3/00 | 381/103 |
| 2009/0220112 A1 * | 9/2009 | Fincham | H04S 1/002 | 381/302 |
| 2011/0010269 A1 * | 1/2011 | Ballard | G06Q 30/0601 | 705/26.1 |

(Continued)

FOREIGN PATENT DOCUMENTS

| | | |
|---|---|---|
| JP | 2000-209699 A | 7/2000 |
| JP | 2015-229403 A | 12/2015 |

(Continued)

OTHER PUBLICATIONS

Japanese Office Action received in corresponding Japanese application No. 2024-017714 dated Aug. 26, 2025 with English translation (7 pages).

*Primary Examiner* — William J Deane, Jr.

(74) *Attorney, Agent, or Firm* — Rankin, Hill & Clark LLP

(57) ABSTRACT

An active driving sound effect generator includes a waveform generator to generate a signal depending on vehicle information, multiple speakers to output the signal generated by the waveform generator, and a sound image control processor to change a volume of an output of the signal from each of the multiple speakers. The waveform generator generates a low frequency waveform signal containing relatively many low frequency components and a high frequency waveform signal containing more high frequency components than the low frequency waveform signal does.

5 Claims, 9 Drawing Sheets

(56) References Cited

U.S. PATENT DOCUMENTS

| | | | | |
|---|---|---|---|---|
| 2013/0216054 A1* | 8/2013 | Inoue | G10K 15/02 381/61 |
| 2015/0353007 A1* | 12/2015 | Inoue | G10K 15/02 903/902 |
| 2018/0277091 A1* | 9/2018 | Niibe | B60K 35/10 |
| 2019/0228759 A1 | 7/2019 | Wang et al. | |

FOREIGN PATENT DOCUMENTS

| | | |
|---|---|---|
| JP | 2019-128378 A | 8/2019 |
| JP | 2022-155835 A | 10/2022 |

* cited by examiner

ACTIVE DRIVING SOUND EFFECT GENERATOR

BACKGROUND OF THE INVENTION

1. Field of the Invention

The present invention relates to an active driving sound effect generator.

2. Description of the Related Art

Heretofore, regarding vehicle driving operations, an active sound effect generator has been studied which generates sound effects according to changes in the vehicle speed in response to driver's accelerator pedal operations (for example, Patent Literature 1 and Patent Literature 2).

Regarding the technique related to an active sound effect generator, Abstract of Patent Literature 1 describes an active sound effect generator that can realize at least one of generation of more natural sound effects and applicability of the generator even to an electric vehicle (see Patent Literature 1).

ABSTRACT of Patent Literature 2 describes an active sound effect generator which generates a sound effect along with an increase in the vehicle speed such that the sound effect is highly realistic as an automobile driving sound even in a high-speed region (see Patent Literature 2).

As a technique related to an audio output control apparatus in a vehicle, Abstract of Patent Literature 3 describes an audio output control apparatus that plays back sound data from a digital versatile disc (DVD) as a Dolby Digital 5.1ch surround sound (see Patent Literature 3). Using a surround speaker system, the audio output control apparatus described in Patent Literature 3 outputs 5.1ch surround sound signals from front right and left speakers, rear right and left speakers, center and subwoofer speakers of a vehicle.

PRIOR ART DOCUMENT(S)

Patent Literature(s)

Patent Literature 1: JP2015-229403A
Patent Literature 2: JP2019-128378A
Patent Literature 3: JP2000-209699A In order to provide passengers with a more realistic driving sound effect, it is desirable to control a sound image of the sound effect generated according to a driving condition such that the sound image is generated in an appropriate place. For example, it is desirable to control a sound image of a component imitating an intake sound such that it is generated from the engine room direction on the front side of the vehicle, and control a sound image of a component imitating an exhaust sound such that it is generated from a direction where the muffler is installed on the rear side of the vehicle.

However, the active sound effect generators described in Patent Literature 1 and Patent Literature 2 are incapable of controlling a sound image because they output a driving sound effect uniformly from the speakers. Meanwhile, the audio output control apparatus described in Patent Literature 3 merely outputs the 5.1ch surround sound signals as they are from the respective speakers and is configured with no consideration given to control of a sound effect generated depending on a driving condition such that the sound effect can give a passenger a more realistic sensation.

SUMMARY OF THE INVENTION

The present invention was made in view of the above circumstances, and has an object to provide an active driving sound effect generator capable of causing a passenger to associate a low frequency component signal generated on a vehicle front side with an intake sound and to associate a high frequency component signal generated on a vehicle rear side with an exhaust sound, thereby providing the passenger with a realistic sensation as if they were in an engine-equipped vehicle.

To achieve the above object of the present invention, an active driving sound effect generator is an active driving sound effect generator mounted on a vehicle, comprising a waveform generator configured to generate a signal depending on vehicle information; a plurality of speakers configured to output a signal generated by the waveform generator; and a sound image controller configured to change a volume of an output of the signal from each of the plurality of speakers, wherein the waveform generator generates a low frequency waveform signal containing relatively many low frequency components and a high frequency waveform signal containing more high frequency components than the low frequency waveform signal does, and the sound image controller outputs the low frequency waveform signal at a relatively low volume and the high frequency waveform signal at a relatively high volume from the speaker arranged on a front side of the vehicle, and outputs the low frequency waveform signal at a higher volume and the high frequency waveform signal at a lower volume from the speaker arranged on a rear side of the vehicle than from the speaker arranged on the front side.

According to the present invention, it is possible to cause a passenger to associate a high frequency component signal generated on the front side of the vehicle with an intake sound and to associate a low frequency component signal generated on the rear side of the vehicle with an exhaust sound, thereby providing the passenger with a realistic sensation as if they were in an engine-equipped vehicle.

DETAILED DESCRIPTION OF THE EMBODIMENTS

Figure 1:
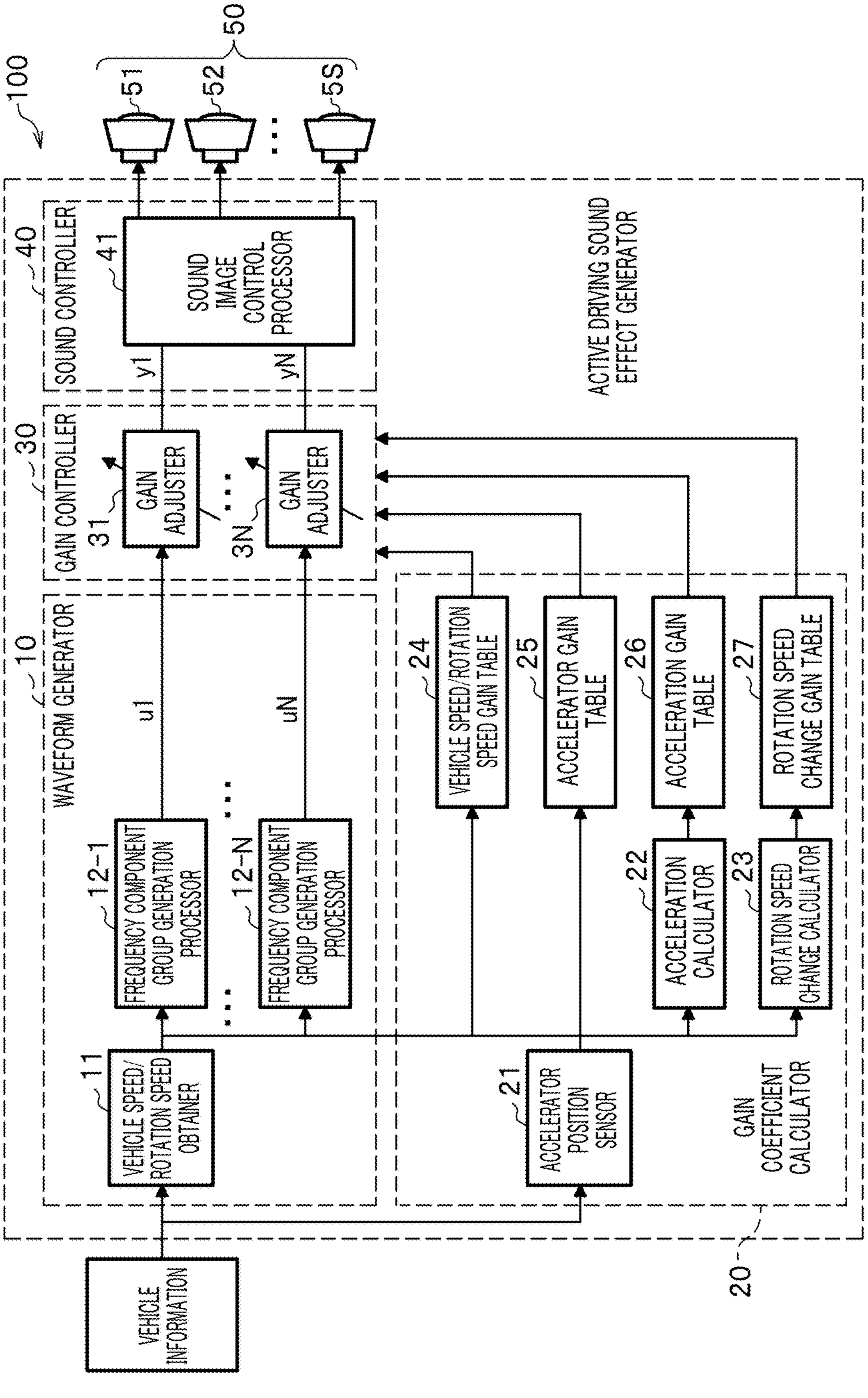
FIG. 1 is a block diagram showing an outline of a configuration of an active driving sound effect generator according to a present embodiment, mounted on a vehicle.

Hereinafter, embodiments for carrying out the present invention will be described in detail. The embodiments described below are examples for carrying out the present invention, and should be modified or altered as needed depending on the structure of an apparatus and various conditions to which the present invention is applied. The present invention should not be limited to the embodiments described below. Moreover, in the drawings, the same constituent elements will be denoted with the same reference signs and description thereof will be omitted if unnecessary.

Present Embodiment

[Outline of Configuration of Active Driving Sound Effect Generator]

Figure 6:
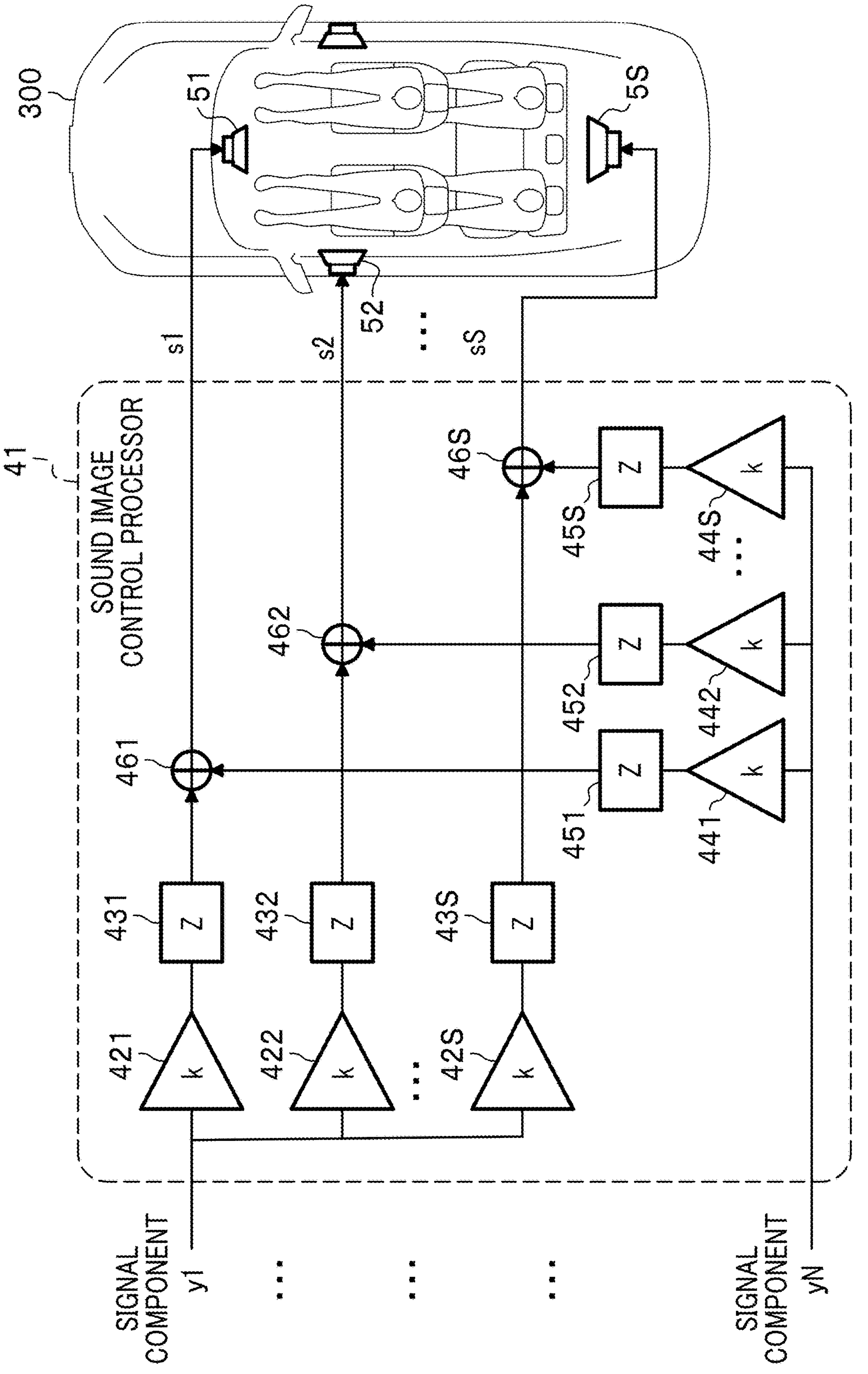
FIG. 6 is a block diagram showing a configuration of a sound image control processor.

FIG. 1 is a block diagram showing an outline of a configuration of an active driving sound effect generator according to a present embodiment, mounted on a vehicle (see FIG. 6).

As shown in FIG. 1, an active driving sound effect generator 100 according to the present embodiment includes a waveform generator 10, a gain coefficient calculator 20, a gain controller 30, a sound controller 40, and speakers 50.

In the present embodiment, the waveform generator 10, the gain coefficient calculator 20, the gain controller 30, and the sound controller 40 constitute an active sound control (ASC) apparatus. The active sound control is a system for improving the sound quality of an acceleration sound heard inside a vehicle depending on an accelerator position. In other words, the active sound control provides a user with an acceleration sound according to a vehicle speed or a rotation speed of a power unit by outputting the sound synchronized with the vehicle speed or the rotation speed from the speakers 50 to the inside of the vehicle.

As shown in a vehicle 300 in FIG. 6 to be described later, the speakers 50 shown in FIG. 1 include a speaker 51 arranged on a front side of the vehicle 300 (for example, in front of a driver's seat and a front passenger seat), a speaker 52 arranged at approximately the center of the vehicle 300 (for example, beside the driver's seat or the front passenger seat), and a speaker 5S arranged on a rear side of the vehicle 300 (for example, behind rear passenger seats).

The vehicle 300 is any of electric automobiles including, for example, a fuel cell vehicle and a hybrid vehicle, and the like, and includes a motor (not shown). This motor is controlled by a motor electronic controller (ECU) (not shown).

The waveform generator 10 of the active driving sound effect generator 100 generates a signal from a waveform table according to vehicle information. The waveform generator 10 includes multiple waveform tables and generates signals respectively from the multiple waveform tables. The vehicle information herein indicates a vehicle speed or a rotation speed of a power unit. The power unit is not limited to the motor, but may be, for example, an engine.

The waveform generator 10 includes a vehicle speed/rotation speed obtainer 11 and frequency component group generation processors 12-1, . . . , 12-N. The frequency component group generation processors 12-1, . . . , 12-N will be also simply referred to as the frequency component group generation processors 12 when any one of them does not have to be specified.

The vehicle speed/rotation speed obtainer 11 obtains, as the vehicle information, the vehicle speed or the rotation speed of the power unit from the vehicle 300 (see FIG. 6). The vehicle speed/rotation speed obtainer 11 includes, for example, a vehicle speed sensor. The vehicle speed/rotation speed obtainer 11 obtains the vehicle speed or the rotation speed of the power unit based on a rotation speed of the motor or a vehicle shaft (not shown) by means of the vehicle speed sensor, and supplies the obtained information to the gain coefficient calculator 20.

Each of the frequency component group generation processors 12-1, . . . , 12-N has a corresponding waveform table (tone). For example, the frequency component group generation processor 12-1 has a low frequency waveform table containing relatively many low frequency components, while a frequency component group generation processor 12-2 (where N is 2) has a high frequency waveform table containing more high frequency components than the low frequency waveform table does. The low frequency waveform table only has to contain more low frequency components than high frequency components and may be composed of only low frequency components. The high frequency waveform table only has to contain more high frequency components than low frequency components, and may be composed of only high frequency components. The low frequency waveform table and the high frequency waveform table are not limited to waveform tables but may be data containing low frequency waveform signals and high frequency waveform signals.

The waveform generator 10 includes multiple waveform tables because the frequency component group generation processors 12-1, . . . , 12-N include respectively different waveform tables.

Figure 2:
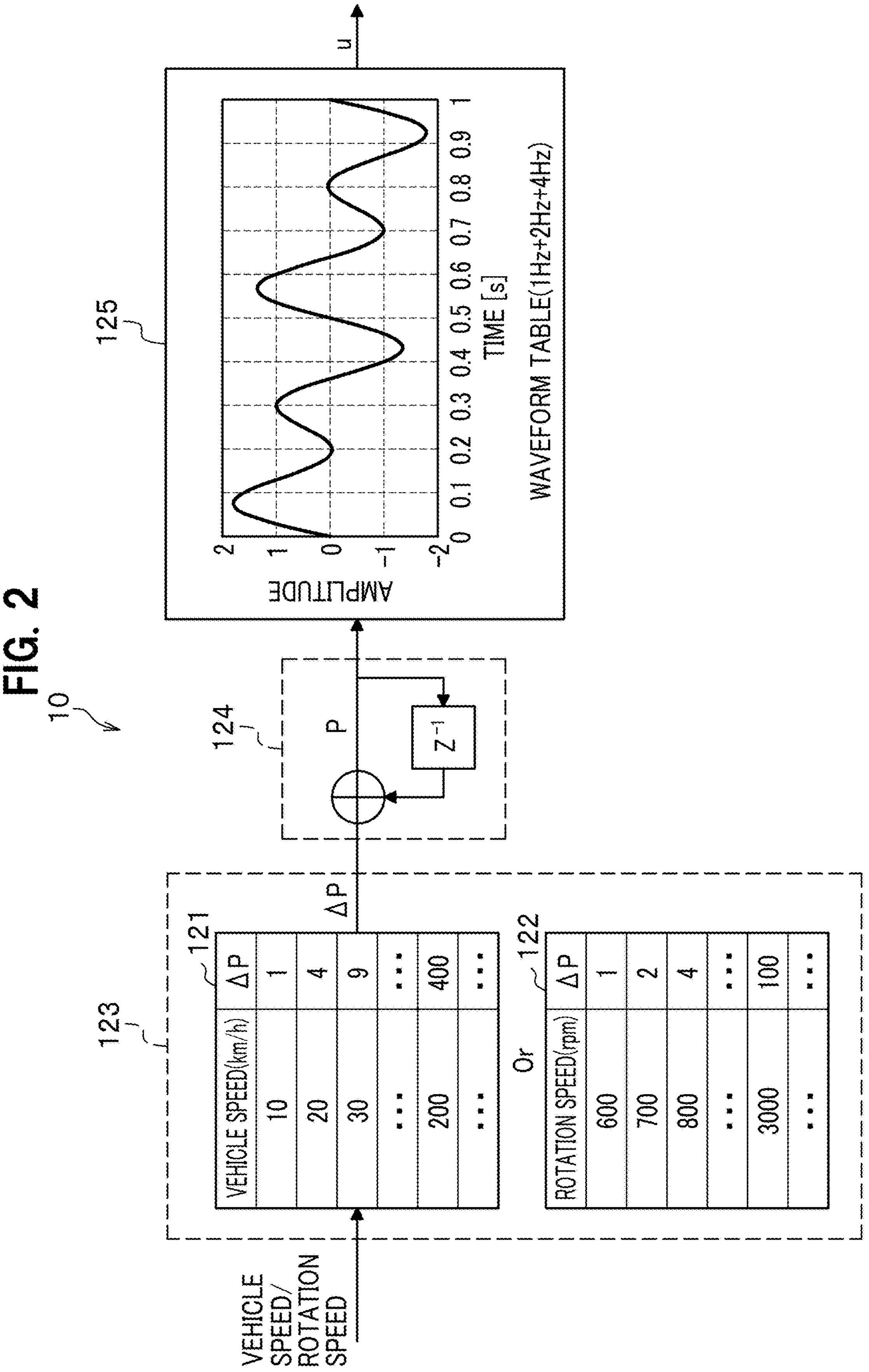
FIG. 2 is a block diagram showing an outline of a configuration of a waveform generator.

FIG. 2 is a block diagram showing an outline of a configuration of the waveform generator. As shown in FIG. 2, the waveform generator 10 includes a skip table 123 and a generation processor 124. The generation processor 124 has a waveform table 125 that forms a tone. The waveform table 125 contains waveform data to be read by the generation processor 124 and is composed of table values. The waveform table 125 is an example of waveform data which has one cycle of 1 [s] and which contains multiple frequency components (1 [Hz], 2 [Hz], and 4 [Hz]).

The skip table 123 obtains a skip number for read positions based on the vehicle information. The skip table 123 is provided to, for example, the vehicle speed/rotation speed obtainer 11.

The skip table 123 includes at least one of a vehicle speed step table 121 and a rotation speed step table 122. In the vehicle speed step table 121, a skip number (read pitch) $\Delta P$ is defined based on the vehicle speed [km/h] of the vehicle 300. In the rotation speed step table 122, a skip number $\Delta P$ is defined based on the rotation speed [rpm] of the power unit. The skip number specifies, for example, a read pitch at which waveform data is to be read from the waveform table 125. In other words, the skip number specifies a rate for thinning out the waveform table 125, and is set to an n-times speed value for playback of the waveform table 125 at n-times speed.

The skip table 123 stores skip numbers ΔP in a table format. For example, based on the vehicle speed step table 121, the vehicle speed/rotation speed obtainer 11 reads a skip number ΔP of 1 when the vehicle speed is 10 [km/h] and reads a skip number ΔP of 4 when the vehicle speed is 20 [km/h]. In addition, the vehicle speed/rotation speed obtainer 11 reads a skip number ΔP of 9 when the vehicle speed is 30 [km/h] and reads a skip number ΔP of 400 when the vehicle speed is 200 [km/h].

Meanwhile, for example, based on the rotation speed step table 122, the vehicle speed/rotation speed obtainer 11 reads a skip number ΔP of 1 when the rotation speed of the power unit is 600 [rpm] and reads a skip number ΔP of 2 when the rotation speed of the power unit is 700 [rpm]. The vehicle speed/rotation speed obtainer 11 reads a skip number ΔP of 4 when the rotation speed of the power unit is 800 [rpm] and reads a skip number ΔP of 100 when the rotation speed of the power unit is 3000 [rpm].

In this way, when the vehicle speed/rotation speed obtainer 11 obtains the vehicle speed or the rotation speed of the power unit, the waveform generator 10 obtains the skip number ΔP for the read positions based on the obtained vehicle speed or rotation speed. In the vehicle speed step table 121 or the rotation speed step table 122, skip numbers desired by a user are defined as the skip numbers ΔP.

Meanwhile, the generation processor 124 is provided to each of the frequency component group generation processors 12-1, . . . , 12-N. In other words, the generation processors 124 correspond to the respective frequency component group generation processors 12-1, . . . , 12-N. Based on the skip number ΔP obtained by the vehicle speed/rotation speed obtainer 11, each of the generation processors 124 reads the signal in the waveform table 125 at every position specified by the sum of every previous read position and the obtained skip number ΔP, thereby generating a signal (that is, a waveform table read at intervals of the skip number ΔP) to be input to the speakers 50.

Here, the signal generated by the generation processor 124 is defined by following Formula (1):

[Formula 1]

$$P(t+1) = P(t) + \Delta P(t), \tag{1}$$

where P(t) denotes a pointer, P(0) denotes an initial value 0, and ΔP(t) denotes a skip number.

As shown in Formula (1), the signal to be input to the speakers 50 is generated, based on the skip number ΔP read from the skip table 123 by the vehicle speed/rotation speed obtainer 11 and the previous value of the pointer P(t), by reading out the waveform table 125 at the position advanced by the skip number ΔP from the previous value of the pointer (t). In this case, the waveform data pieces in the waveform table 125 read at the intervals of the skip number ΔP constitute the signal (tone).

Figure 3A:
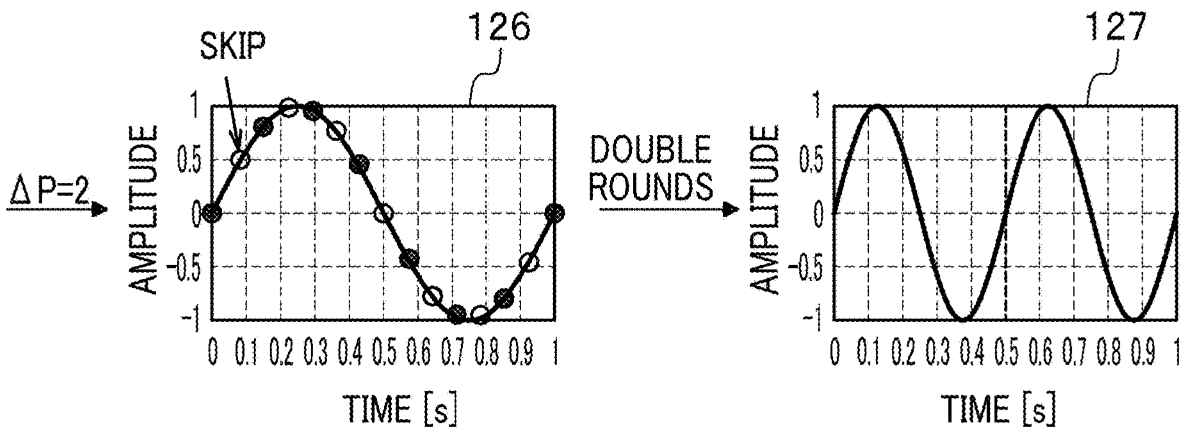
FIG. 3A is an explanatory diagram showing a concept in which a generation processor reads a signal (waveform data) at a position specified by a sum of a previous read position and an obtained skip number (No. 1).
Figure 3B:
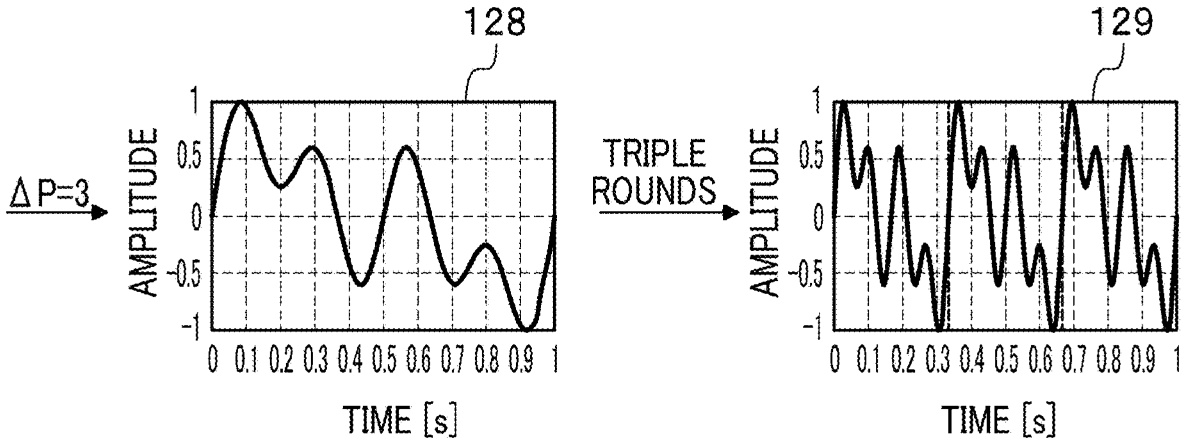
FIG. 3B is an explanatory diagram showing the concept in which the generation processor reads the signal (waveform data) at the position specified by the sum of the previous read position and the obtained skip number (No. 2).

FIGS. 3A and 3B are explanatory diagrams showing a concept in which the generation processor reads a signal (waveform data) at every position specified by the sum of every previous read position and the obtained skip number ΔP.

FIG. 3A shows a concept in which the generation processor 124 reads a signal (waveform data) from a waveform table 126, for example, when the skip number ΔP is 2. As shown in FIG. 3A, from waveform data (the waveform table 126) with one cycle per second, the generation processor 124 reads waveform data (waveform table 127) in double cycles (double rounds) from the previous read position.

FIG. 3B shows a concept in which the generation processor 124 reads a signal (waveform data) from a waveform table 128, for example, when the skip number ΔP is 3. As shown in FIG. 3B, from waveform data (waveform table 128) with one cycle per second, the generation processor 124 reads waveform data (waveform table 129) in triple cycles (triple rounds) from the previous read position.

Here, each of the waveform tables 126 and 128 holds one cycle of values of the signal (waveform data) in a table data format. The present embodiment has a feature in the waveform tables 126 and 128 from which the waveform generator 10 reads the waveform data.

Figure 4:
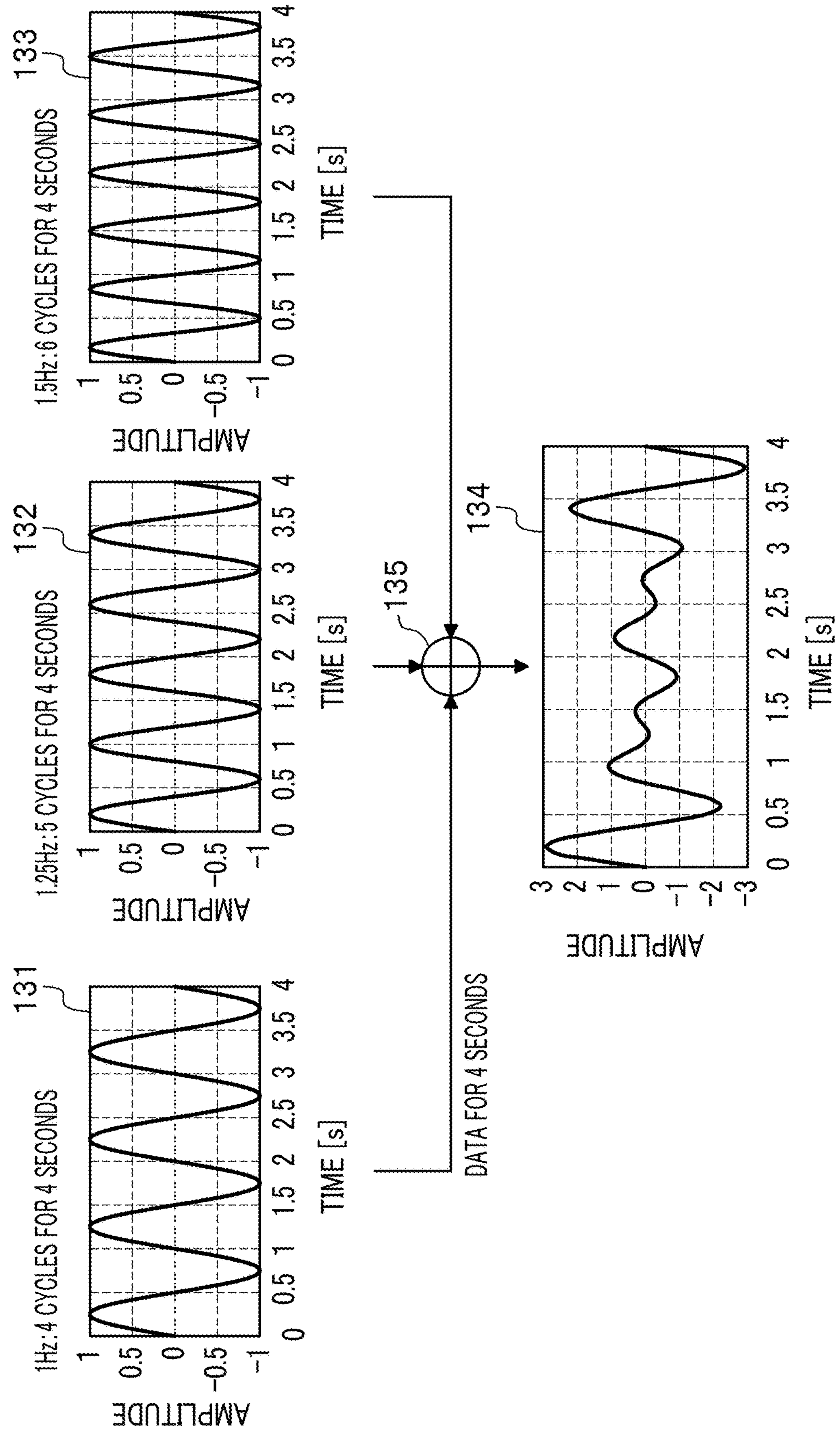
FIG. 4 is an explanatory diagram showing an example of processing of synthesizing a waveform table.

FIG. 4 is an explanatory diagram showing an example of processing for synthesizing a waveform table. FIG. 4 shows the processing for synthesizing a waveform table 134 of waveform data having three frequency components from a waveform table 131 with a frequency of 1 [Hz], a waveform table 132 with a frequency of 1.25 [Hz], and a waveform table 133 with a frequency of 1.5 [Hz].

The three waveform tables 131, 132, and 133 have different cycles, and therefore cannot be synchronized in the unit of one second. For this reason, in the present embodiment, in order to generate the waveform table 134 having the three frequency components, the frequencies of the waveform tables 131, 132, and 133 are multiplied by every integer value while their frequency ratio is maintained, and a minimum time [s] (multiplier) at which the three waveform tables 131, 132, and 133 can be synchronized is determined among the integer values with each of which all the integer multiples of the frequencies are converted to integers. As a result of transforming the waveform data in the waveform tables 131, 132, and 133 to waveform data whose frequency ratio is expressed by the integers, the waveform data in the waveform tables 131, 132, and 133 take the same values at the start point and the end point of the minimum time [s] and can be synchronized at every timing therein. Thus, in the present embodiment, one cycle is set to the minimum time [s] at which the waveform tables 131, 132, and 133 can be synchronized, and the waveform table 134 having the three frequency components is synthesized by combining the waveform data in all the waveform tables 131, 132, and 133.

In this way, in the present embodiment, after the numeric values in the frequency ratio of the waveform tables 131, 132, and 133 are converted to integers, a time (minimum time) for minimum required data strings of waveform data is determined.

In the case in FIG. 4, the frequency ratio of the waveform table 131 with 1 [Hz], the waveform table 132 with 1.25 [Hz], and the waveform table 133 with 1.5 [Hz] is 1:1.25:1.5. This frequency ratio will be 4:5:6 or 100:125:150 as a result of multiplication by an integer. In this case, the minimum time [s] at which the waveform tables 131, 132, and 133 can be synchronized is determined as 4 [s] because (1:1.25:1.5)×4 is equal to 4:5:6. With the determination of the minimum time (4 [s]), the waveform data in the waveform table 131 is transformed to waveform data for four cycles, the waveform data in the waveform table 132 is transformed to waveform data for five cycles, and the waveform data in the waveform table 133 is transformed to waveform data for six cycles.

Then, for the waveform table 134, the waveform data for the minimum time [s] set as one cycle is generated by adding up the cyclic data of the integer multiples (four cycles, five cycles, and six cycles) of the waveform tables 131, 132, and 133 within the minimum time (4 [s]) at which the waveform tables 131, 132, and 133 can be synchronized. Thus, the generated waveform table 134 is a cyclic waveform table in which the end point and the start point of the waveform data are continuous, and is the table containing the multiple frequency components.

In other words, in the present embodiment, the waveform table 134 is formed of the waveform data with one cycle of the waveform table set to a minimum multiplier (that is, a minimum time) with which all the numeric values in the ratio of the multiple frequencies are converted to integers while their frequency ratio is maintained.

In this way, the waveform table 134 containing the multiple frequency components is generated from the waveform data in the waveform tables 131, 132, and 133 containing the frequency components desired by a user.

Returning to FIG. 1, the gain coefficient calculator 20 in the active driving sound effect generator 100 includes an accelerator position sensor 21, an acceleration calculator 22, a rotation speed change calculator 23, a vehicle speed/rotation speed gain table 24, an accelerator gain table 25, an acceleration gain table 26, and a rotation speed change gain table 27.

The accelerator position sensor 21 detects the position of an accelerator pedal (this will be referred to as the accelerator position θ) when the user depresses the accelerator pedal of the vehicle 300.

The acceleration calculator 22 obtains the vehicle speed or the rotation speed of the power unit from the vehicle speed/rotation speed obtainer 11 and calculates an acceleration Δa.

The rotation speed change calculator 23 obtains the vehicle speed or the rotation speed of the power unit from the vehicle speed/rotation speed obtainer 11 and calculates a rotation speed change Δb.

The vehicle speed/rotation speed gain table 24 has a feature of adding a gain to the vehicle speed or the rotation speed of the power unit provided. The accelerator gain table 25 has a feature of adding a gain to the detected accelerator position θ. The acceleration gain table 26 has a feature of adding a gain to the calculated acceleration Δa. The rotation speed change gain table 27 has a feature of adding a gain to the calculated rotation speed change Δb.

In each of the vehicle speed/rotation speed gain table 24, the accelerator gain table 25, the acceleration gain table 26, and the rotation speed change gain table 27, certain characteristics desired by the user are set as needed in a table format.

The gain controller 30 of the active driving sound effect generator 100 includes multiple gain adjusters 31, . . . , 3N. The gain controller 30 obtains signals u1, . . . , uN generated in the respective frequency component group generation processors 12-1, . . . , 12-N and obtains a coefficient for adjusting the gain of each of the signals u1, . . . , uN from the gain coefficient calculator 20.

The multiple gain adjusters 31, . . . , 3N are in charge of the respective signals u1, . . . , uN generated from the waveform tables in the frequency component group generation processors 12-1, . . . , 12-N. Thus, each of the gain adjusters 31, . . . , 3N adjusts the gain of the corresponding one of the signals u1, . . . , uN generated in the frequency component group generation processors 12-1, . . . , 12-N by using the coefficient of the gain obtained from the gain coefficient calculator 20.

Figure 5:
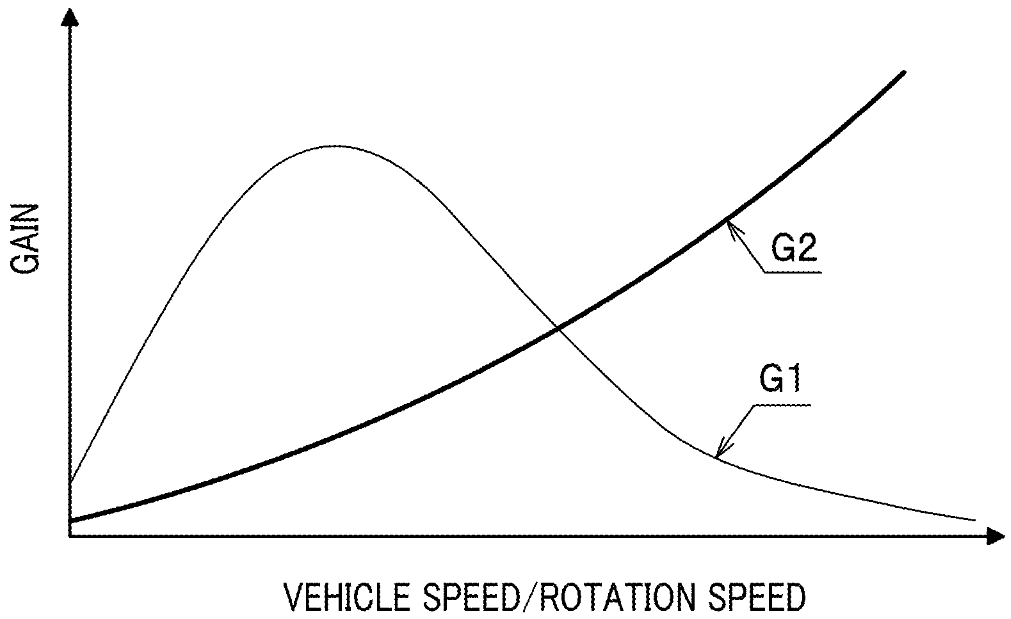
FIG. 5 is an explanatory diagram showing characteristics of each gain adjuster of a gain controller to add a gain to a signal obtained from the waveform generator.

FIG. 5 is an explanatory diagram showing characteristics of each of the gain adjusters of the gain controller to add a gain to a signal obtained from the waveform generator.

As shown in FIG. 5, when the vehicle speed or the rotation speed is relatively low, the gain controller 30 increases (raises) a gain for the low frequency waveform table according to a gain G1 prescribed for low frequency components. On the other hand, when the vehicle speed or the rotation speed is relatively high, the gain controller 30 increases a gain for the high frequency waveform table according to a gain G2 prescribe for high frequency components.

In FIG. 5, the gain G1 shows characteristics of the gain for the low frequency components (low frequency waveform signals) and the gain G2 shows characteristics of the gain for the high frequency components (high frequency waveform signals).

For example, in the case where the frequency component group generation processor 12-1 includes a low frequency waveform table and the frequency component group generation processor 12-2 (where N is 2) includes a high frequency waveform table, the gain adjuster 31 emphasizes and outputs the low frequency components in the low frequency waveform table of the frequency component group generation processor 12-1 according to the gain G1, when the vehicle speed or the rotation speed is relatively low.

On the other hand, when the vehicle speed or the rotation speed is relatively high, the gain adjuster 32 (where N is 2) emphasizes and outputs the high frequency components in the high frequency waveform table of the frequency component group generation processor 12-2 according to the gain G2.

The sound controller 40 (see FIG. 1) of the active driving sound effect generator 100 includes a sound image control processor 41. The sound image control processor 41 changes (adjusts) the volume of an output of each of multiple signal components y1, . . . , yN from each of the multiple speakers 50 (51, 52, . . . , 5S).

The sound image control processor 41 inputs the signals to each of the speakers 50 and each of the speakers 50 outputs an output sound, which is expressed by following Formula (2):

[Formula 2]

$$s_S = \sum_{n=1}^{N} Z^{-D_{nS}} k_{nS} y_n, \tag{2}$$

where $S_s$ denotes an output sound of an S-th speaker, n denotes a frequency component number, N denotes a total number of frequency component groups, $K_{nS}$ denotes a gain coefficient for outputting an n-th frequency component group from the S-th speaker, and $D_{nS}$ denotes a time delay for outputting the n-th frequency component group from the S-th speaker.

As shown in Formula (2), for each of the signal components y1, . . . , yN obtained from the signals u1, . . . , uN generated in the frequency component group generation processors 12-1, . . . , 12-N, the sound image control processor 41 adjusts the volume by multiplying the signal component by each of gains set for the respective speakers 50, and also adjusts the delay time. As a result, the output sound from each of the speakers 51, 52, . . . , 5S is a sum total (result) of the frequency components with the adjusted volumes.

As a result, the sound image control processor 41 outputs the low frequency waveform signals (low frequency components) at relatively low volumes and outputs the high frequency waveform signals (high frequency components) at relatively high volumes from the speaker 51 arranged on the front side of the vehicle 300, and outputs the low frequency waveform signals (low frequency components) at higher volumes and outputs the high frequency waveform signals (high frequency components) at lower volumes from the speaker 5S arranged on the rear side than from the speakers 51 and 52 arranged on the front side.

In addition, the sound image control processor 41 is capable of adjusting a signal phase of each of the multiple signal components y1, . . . , yN for each of the speakers 50. Thus, the speaker 51 arranged on the front side of the vehicle 300 is enabled to output the high frequency waveform signals earlier and the low frequency waveform signals later than the speaker 5S arranged on the rear side of the vehicle 300 does.

FIG. 6 is a block diagram showing a configuration of the sound image control processor. As shown in FIG. 6, the sound image control processor 41 includes amplifiers 421, 422, . . . , 42S, 441, 442, . . . , 44S each of which multiplies the corresponding one of the multiple signal components y1, . . . , yN by a constant for the corresponding one of the speakers 51, 52, . . . , 5S.

FIG. 6 shows the case where the speakers 51, 52, . . . , 5S are arranged. In this case, for the signal component y1 of the frequency component group generation processor 12-1, which assumes an intake sound, the sound image control processor 41 sets, for example, a coefficient of 1.0 for the amplifier 421, a coefficient of 0.5 for the amplifier 422, and a coefficient of 0.0 for the amplifier 42S. As a result, the sound image control processor 41 localizes a sound image of the signal component y1 on the front side of the vehicle.

On the other hand, for the signal component yN of the frequency component group generation processor 12-N, which assumes an exhaust sound, the sound image control processor 41 sets, for example, a coefficient of 0.0 for the amplifier 441, a coefficient of 0.5 for the amplifier 442, and a coefficient of 1.0 for the amplifier 44S. As a result, the sound image control processor 41 localizes a sound image of the signal component yN on the rear side of the vehicle.

As a result, the speaker 51 outputs the high frequency components at higher volumes than the speakers 52 and 5S do, and the speaker 52 outputs the high frequency components at higher volumes than the speaker 5S does. On the other hand, the speaker 5S outputs the low frequency components at higher volumes than the speakers 51 and 52 do, and the speaker 52 outputs the low frequency components at higher volumes than the speaker 51 does. The sound image control processor 41 may divide the multiple speakers 50 (51, 52, . . . , 5S) into front and rear groups in a vehicle cabin, and collectively control the speakers in each of the groups.

The sound image control processor 41 also includes delay adjustment elements 431, 432, . . . , 43S, 451, 452, . . . , 45S each of which adjusts the signal phase of the corresponding one of the multiple signal components y1, . . . , yN for the corresponding one of the speakers 51, 52, . . . , 5S.

In the delay adjustment elements 431, 432, . . . , 43S, 451, 452, . . . , 45S, a digital value is set as a delay time for each of the signal components y1, . . . , yN. This makes it possible for the speaker 51 arranged on the front side of the vehicle 300 to output the high frequency waveform signals (high frequency components) earlier and output the low frequency waveform signals (low frequency components) later than the speakers 52, . . . , 5S arranged on the rear side of the vehicle 300 do.

Thus, the speaker 51 outputs an added signal s1 into the vehicle cabin, the added signal s1 obtained by an adder 461 adding the signal amplified by the amplifier 421 and delayed by the delay adjustment element 431 and the signal amplified by the amplifier 441 and delayed by the delay adjustment element 451. The speaker 52 outputs an added signal s2 into the vehicle cabin, the added signal s2 obtained by an adder 462 adding the signal amplified by the amplifier 422 and delayed by the delay adjustment element 432 and the signal amplified by the amplifier 442 and delayed by the delay adjustment element 452. The speaker 5S outputs an added signal sS into the vehicle cabin, the added signal sS obtained by an adder 46S adding the signal amplified by the amplifier 42S and delayed by the delay adjustment element 43S and the signal amplified by the amplifier 44S and delayed by the delay adjustment element 45S.

[Operations of Active Driving Sound Effect Generator]

<Operation 1>

Next, operations of the active driving sound effect generator 100 according to the present embodiment will be described in reference to FIG. 1 and FIGS. 7A to 9B.

In the active driving sound effect generator 100, the vehicle speed/rotation speed obtainer 11 obtains the vehicle speed or the rotation speed of the power unit as the vehicle information of the vehicle 300. The vehicle speed/rotation speed obtainer 11 obtains the skip number ΔP based on the obtained vehicle speed or rotation speed of the power unit.

Each of the frequency component group generation processors 12-1, . . . , 12-N (generation processors 124) reads, from the corresponding one of the waveform tables, the signal at the position specified by the sum of the read position P(t) and the skip number ΔP and inputs the read signal to the gain controller 30.

The gain coefficient calculator 20 calculates the gain coefficient for each of the signals u1, . . . , uN based on the accelerator position θ of the accelerator position sensor 21 and the vehicle speed or the rotation speed of the power unit obtained by the vehicle speed/rotation speed obtainer 11, from the vehicle speed/rotation speed gain table 24, the accelerator gain table 25, the acceleration gain table 26, and the acceleration gain table 26.

The gain controller 30 controls (adjusts) the gains for the signals u1, . . . , uN generated from the respective multiple waveform tables in the frequency component group generation processors 12-1, . . . , 12-N, by using the respective gain coefficients calculated by the gain coefficient calculator 20.

The sound controller 40 changes the output volumes for the signal components y1, . . . , yN for each of the multiple speakers 50 and inputs the resultant signal to each of the speakers 50. As a result, each of the speakers 50 can output the signals u1, . . . , uN generated in the waveform generator 10.

<Operation 2>

In the present embodiment, the active driving sound effect generator 100 includes the multiple waveform tables because the frequency component group generation processors 12-1, . . . , 12-N in the waveform generator 10 include their respective waveform tables. Therefore, the waveform generator 10 can receive a user's operation and switch the waveform table among from the multiple waveform tables according to the user's operation.

Figure 7A:
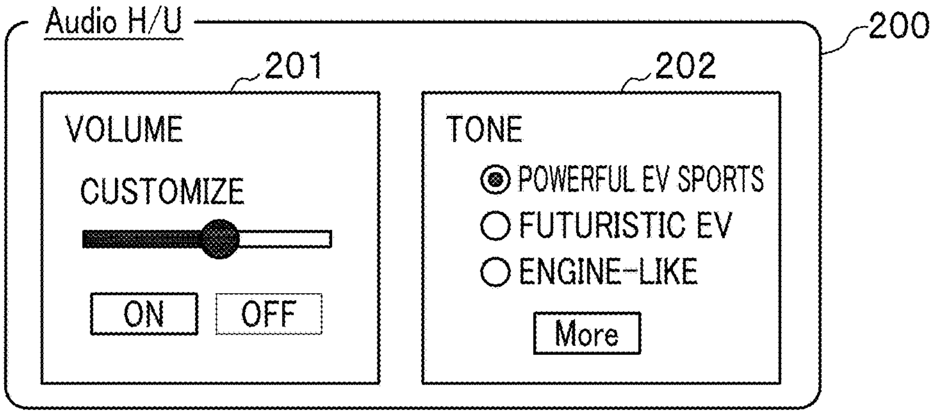
FIG. 7A shows a display audio provided in a vehicle.
Figure 7B:
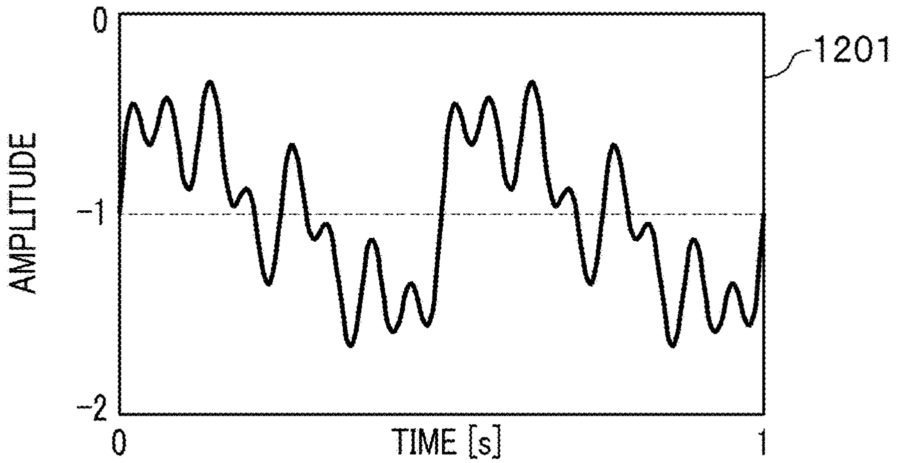
FIG. 7B shows a low frequency waveform table that is an example of a powerful EV sports tone.
Figure 7C:
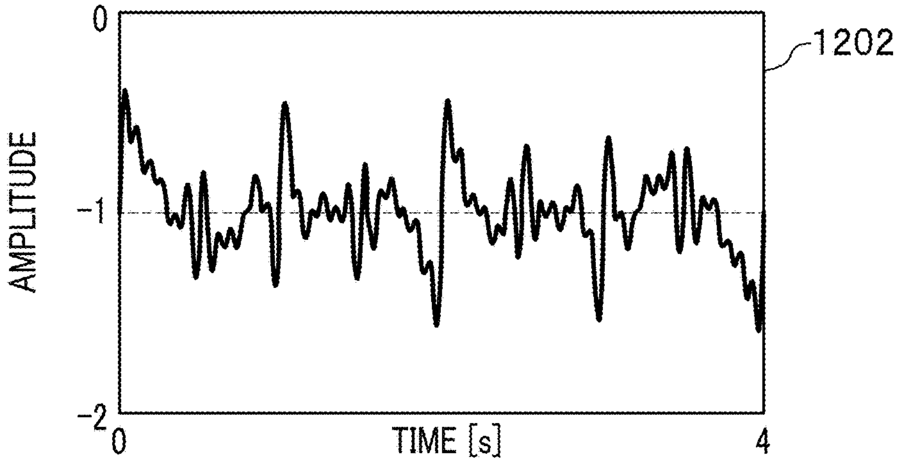
FIG. 7C shows a high frequency waveform table that is an example of a futuristic EV tone.

FIGS. 7A to 7C are explanatory diagrams showing that a desired waveform table is selectable from the multiple waveform tables included in the frequency component group generation processors of the waveform generator.

FIG. 7A shows a display audio provided in the vehicle 300. As shown in FIG. 7A, a display audio 200 is provided with a volume screen 201 and a tone screen 202.

The volume screen 201 is configured to receive ON/OFF for customizing a volume adjustment by a user, and allow the user to adjust the volume when ON is set.

The tone screen 202 is configured to enable tone switchover in response to a user's operation of selecting any of buttons. For example, the tone screen 202 allows a selection from a powerful electric vehicle (EV) sports tone and a futuristic EV tone. In this case, when the user selects the powerful EV sports tone, a waveform table 1201 shown in FIG. 7B is selected from the frequency component group generation processors 12-1, . . . , 12-N of the waveform generator 10. On the other hand, when the user selects the futuristic EV tone, a waveform table 1202 shown in FIG. 7C is selected from the frequency component group generation processors 12-1, . . . , 12-N of the waveform generator 10.

The waveform table 1201 in FIG. 7B shows a low frequency waveform table that is an example of the powerful EV sports tone, for example, and the waveform table 1202 in FIG. 7C shows a high frequency waveform table that is an example of the futuristic EV tone, for example.

The waveform table 1201 is provided for, for example, the frequency component group generation processor 12-1, and the waveform table 1202 is provided for, for example, the frequency component group generation processor 12-2, so that the user is allowed to select the waveform table for outputting their favorite tone.

In another possible mode, an extra waveform table for outputting a favorite tone may be added by the user. For example, the tone screen 202 may be configured to include a button 203 for receiving an addition of a tone by the user.

<Operation 3>

Figure 8A:
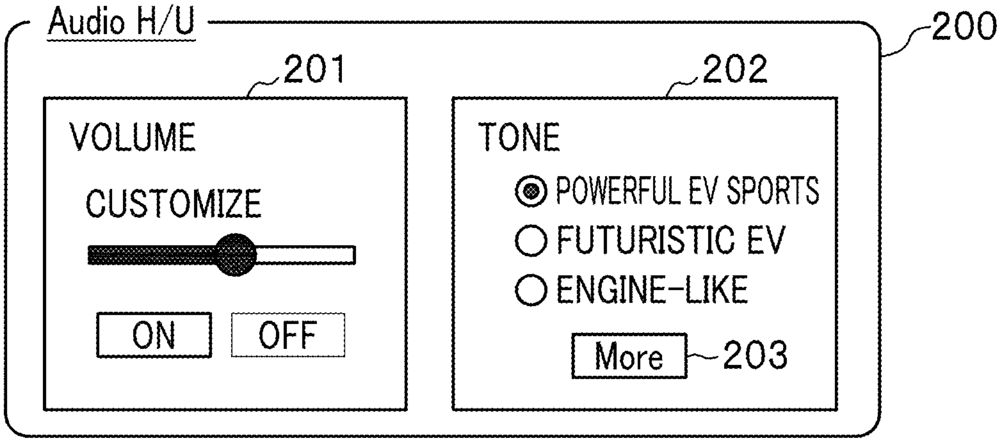
FIG. 8A is an explanatory diagram showing a configuration in which a tone screen of the display audio is provided with a button for adding a tone (waveform table).
Figure 8B:
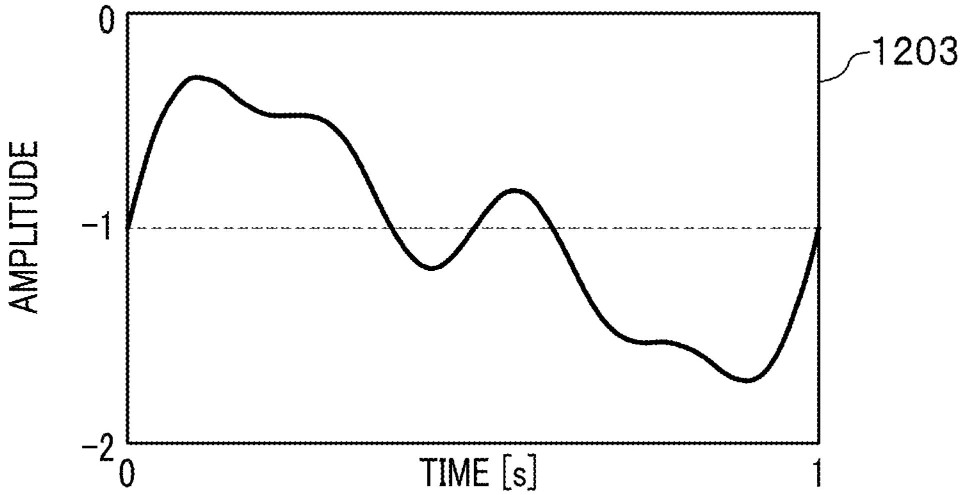
FIG. 8B is an explanatory diagram showing a waveform table added to the waveform generator by a user.

FIG. 8A is an explanatory diagram showing a configuration in which the tone screen of the display audio is provided with a button for adding a tone (waveform table). FIG. 8B is an explanatory diagram showing a waveform table added to the waveform generator by the user. A waveform table 1203 is waveform data downloaded from the Internet as tone data by the user. As similar to the waveform table 134, the waveform table 1203 is a cyclic waveform table in which the end point and the start point of the waveform table are continuous and contains multiple frequency components.

In FIG. 8A, the user is allowed to add a desired waveform table to the waveform generator 10 by pressing down a button 203. Thus, the waveform generator 10 can add the waveform table 1203 to the multiple waveform tables (the frequency component group generation processors 12-1, . . . , 12-N).

The waveform generator 10 is able to switch the waveform table for generating the signals to be input to the speakers 50 to the added waveform table 1203 among the multiple waveform tables. In this case, the user is allowed to add the waveform table 1203 from, for example, the Internet or an external memory, and select an output of the signals of the added waveform table 1203.

In this way, the waveform generator 10 is able to receive addition of the waveform table 1203 and receive a selection of the waveform data (tone) of the waveform table 1203 to be output from the speakers 50.

<Operation 4>

The waveform generator 10 includes the vehicle speed/rotation speed obtainer 11, and the vehicle speed/rotation speed obtainer 11 includes the skip table 123.

The skip table 123 may include, for example, the vehicle speed step table 121 and the rotation speed step table 122, or may include multiple step tables in short. Thus, in response to a user's selection operation, the skip table 123 can be switched to the selected one of the vehicle speed step table 121 and the rotation speed step table 122.

Figure 9A:
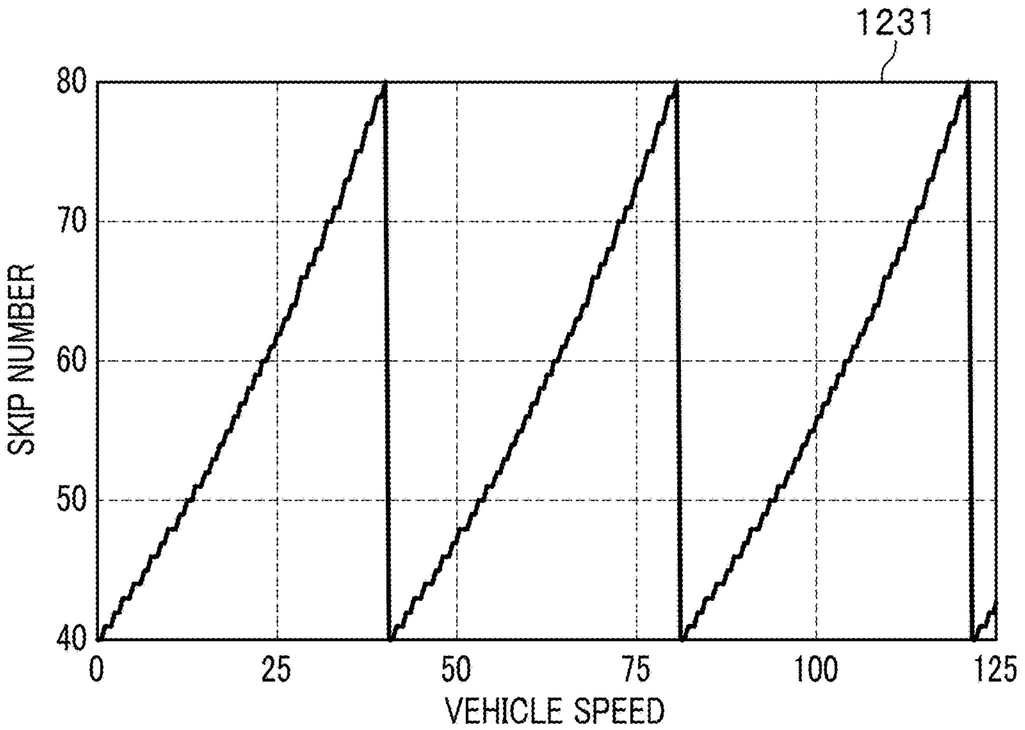
FIG. 9A is an explanatory diagram showing a first skip table.

FIG. 9A is an explanatory diagram showing a first skip table 1231. As shown in FIG. 9A, in the first skip table 1231, based on an increase in the vehicle speed or the rotation speed of the power unit, the skip number is exponentially increased from a lower limit value to an upper limit value and is returned to the lower limit value when reaching the upper limit value. In the first skip table 1231, the skip number again is exponentially increased after being returned to the lower limit value. Thus, the first skip table 1231 enables generation of Shepard tone signals.

Figure 9B:
FIG. 9B is an explanatory diagram showing a second skip table.

FIG. 9B is an explanatory diagram showing a second skip table 1232. As shown in FIG. 9B, in the second skip table 1232, a frequency is increased in proportion to an increase in the vehicle speed or the rotational speed of the power unit, and is decreased by a predetermined level when the vehicle speed or the rotational speed reaches a predetermined value. In the second skip table 1232, after the frequency is decreased, the frequency is increased again in proportion to an increase in the vehicle speed or the rotational speed of the power unit, so that the frequency is increased in a stepped manner. Thus, the second skip table 1232 enables generation of engine-like tone signals.

For example, when the futuristic EV tone is selected by a user's selection operation on the tone screen 202 in FIG. 7A or 8A, the first skip table 1231 in FIG. 9A is selected. On the other hand, when an engine-like tone is selected by a user's selection operation on the tone screen 202, the second skip table 1232 in FIG. 9B is selected.

Thus, when the first skip table 1231 is selected, the waveform generator 10 can generate futuristic EV tone signals (Shepard tone signals) in the vehicle speed/rotation speed obtainer 11. On the other hand, when the second skip table 1232 is selected, the waveform generator 10 can generate engine-like tone signals in the vehicle speed/rotation speed obtainer 11.

Here, considered is the case where the first skip table 1231 (Shepard tone signal) is selected, in particular. In this case, even though an engine-like tone can be output, the waveform generator 10 purposely does not control the low frequency waveform signals and the high frequency waveform signals according to the positions of the speakers 50 but outputs them as they are from the speakers 51, 52, . . . , 5S, so that the Shepard tone signals can be output.

As described above, the active driving sound effect generator 100 according to the present embodiment includes the waveform generator 10, the speakers 50, and the sound image control processor 41.

According to the present embodiment, the waveform generator 10 generates the low frequency waveform signals containing relatively many low frequency components and the high frequency waveform signals containing more high frequency components than the low frequency waveform signals do. The sound image control processor 41 outputs the low frequency waveform signals (low frequency components) at relatively low volumes and outputs the high frequency waveform signals (high frequency components) at relatively high volumes from the speaker 51 arranged on the front side of the vehicle 300, and outputs the low frequency waveform signals (low frequency components) at higher volumes and outputs the high frequency waveform signals (high frequency components) at lower volumes from the speaker 5S arranged on the rear side than from the speaker 51 arranged on the front side.

With this configuration, the active driving sound effect generator 100 is capable of causing a passenger to associate the high frequency component signals generated from the front side of the vehicle with the intake sound by outputting the low frequency waveform signals (low frequency components) at relatively low volumes, and outputting the high frequency waveform signals (high frequency components) at relatively high volumes from the speaker 51 by using the sound image control processor 41. Meanwhile, the active driving sound effect generator 100 is capable of causing a passenger to associate the low frequency component signals generated from the rear side of the vehicle with the exhaust sound by outputting the low frequency waveform signals (low frequency components) at higher volumes, and outputting the high frequency waveform signals (high frequency components) at lower volumes from the speaker 5S than from the speaker 51 arranged on the front side.

Thus, the active driving sound effect generator 100 is able to provide a passenger in the vehicle 300 with a realistic sensation as if they were in an engine-equipped vehicle.

Moreover, the sound image control processor 41 is able to adjust the signal phase of each of the multiple signal components y1, . . . , yN for each of the speakers 50 as described in reference to FIG. 6. As a result, the speaker 51 arranged on the front side of the vehicle 300 outputs the high frequency waveform signals earlier and outputs the low frequency waveform signals later than the speaker 5S arranged on the rear side of the vehicle 300 does. Here, to adjust the signal phase means to set a digital value as a delay time for each signal.

With this configuration, the active driving sound effect generator 100 is able to cause the high frequency components (high frequency waveform signals) to arrive earlier and the low frequency components (low frequency waveform signals) to arrive later at the front side of the vehicle than at the rear side of the vehicle.

This makes it possible to give a passenger in the vehicle 300 a realistic sensation more similar to an actual sensation in an engine-equipped vehicle.

The sound image control processor 41, in particular, is able to finely adjust the delay times of the signals using the digital values depending on the position of a passenger in the vehicle 300 by means of the delay adjustment elements 431, 432, . . . , 43S, 451, 452, . . . , 45S. As a result, the active driving sound effect generator 100 is able to provide a passenger in the vehicle 300 with a realistic sensation similar to an actual engine sound wherever the passenger is seated in the vehicle 300.

Moreover, in the operation 2 as described in reference to FIGS. 7A to 7C, in the active driving sound effect generator 100, the vehicle information indicates the vehicle speed or the rotation speed of the power unit, and the waveform generator 10 may be able to generate engine-like tone signals in which the frequency is increased in proportion to an increase in the vehicle speed or the rotation speed and is decreased by a predetermined level when the vehicle speed or the rotation speed reaches a predetermined value.

With this configuration, the active driving sound effect generator 100 is able to output engine-like tone signals from the speakers 50 by means of the waveform generator 10 increasing and decreasing the frequency and therefore give a passenger in the vehicle 300 a realistic sensation more similar to a sensation in an engine-equipped vehicle. Specifically, the active driving sound effect generator 100 is able to generate a sound like a gear shift-up sound by means of the waveform generator 10.

Further, in the operation 4 as described in reference to FIGS. 9A and 9B, the waveform generator 10 is able to generate Shepard tone signals in which, based on an increase in the vehicle speed or the rotation speed of the power unit, the frequency is exponentially increased from the lower limit value to the upper limit value, is returned to the lower limit value when reaching the upper limit value, and again is exponentially increased, and may be configured to select which will be generated, the engine-like tone signals or the Shepard tone signals. In the present embodiment, when generation of the Shepard tone signals is selected, the sound image control processor 41 does not control the low frequency waveform signals and the high frequency waveform signals depending on the positions of the speakers 50, but outputs the signal components y1, . . . , yN, as they are, from the front and rear speakers 50.

With this configuration, by means of the waveform generator 10, the active driving sound effect generator 100 is able to further generate the Shepard tone signals and select which will be generated, the engine-like tone signals or the Shepard tone signals. When generation of the Shepard tone signals is selected, the active driving sound effect generator 100 outputs the low frequency signals and the high frequency signals as they are from the front and rear speakers 50 without dividing the sound image signals into the low frequency signals and the high frequency signals and without controlling the low frequency signals and the high frequency signals depending on the positions of the speakers 50.

Thus, by means of the waveform generator 10, the active driving sound effect generator 100 is able to output the Shepard tone signals easily and give a passenger in the vehicle 300 a realistic sensation (for example, an acceleration sensation) different from a sensation in an engine-equipped vehicle.

Moreover, as described in reference to FIG. 6, the sound image control processor 41 includes the amplifiers 421, 422, . . . , 42S, 441, 442, . . . , 44S each of which multiplies the corresponding one of the multiple signal components y1, . . . , yN by a constant for the corresponding one of the speakers 51, 52, . . . , 5S. The constants include 0.

With this configuration, by means of the multiple amplifiers 421, 422, . . . , 42S, 441, 442, . . . , 44S, the active driving sound effect generator 100 is able to easily multiply each of the signals u1, . . . , uN (or the signal components y1, . . . , yN) generated by the generation processors 124. Thus, by means of the multiple amplifiers 421, 422, . . . , 42S, 441, 442, . . . , 44S, the active driving sound effect generator 100 is able to easily control an output of each of the speakers 51, 52, . . . , 5S in the vehicle 300.

What is claimed is:

1. An active driving sound effect generator mounted on a vehicle, comprising:

a waveform generator configured to generate a signal depending on vehicle information;

a plurality of speakers configured to output the signal generated by the waveform generator; and a sound image controller configured to change a volume of an output of the signal from each of the plurality of speakers, wherein the waveform generator generates a low frequency waveform signal containing relatively many low frequency components and a high frequency waveform signal containing more high frequency components than the low frequency waveform signal does, and the sound image controller outputs the low frequency waveform signal at a relatively low volume and the high frequency waveform signal at a relatively high volume from the speaker arranged on a front side of the vehicle, and outputs the low frequency waveform signal at a higher volume and the high frequency waveform signal at a lower volume from the speaker arranged on a rear side of the vehicle than from the speaker arranged on the front side.

2. The active driving sound effect generator according to claim 1, wherein the sound image controller is able to adjust a signal phase of each of a plurality of the signals for each of the speakers, and the speaker arranged on the front side of the vehicle outputs the high frequency waveform signal earlier and the low frequency waveform signal later than the speaker arranged on the rear side of the vehicle does.

3. The active driving sound effect generator according to claim 1, wherein the vehicle information indicates a vehicle speed or a rotation speed of a power unit, the waveform generator is able to generate an engine-like tone signal in which a frequency is increased in proportion to an increase in the vehicle speed or the rotation speed, and decreased by a predetermined level when the vehicle speed or the rotation speed reaches a predetermined value.

4. The active driving sound effect generator according to claim 3, wherein the waveform generator is able to generate a Shepard tone signal in which, based on an increase in the vehicle speed or the rotation speed, a frequency is exponentially increased from a lower limit value to an upper limit value, is returned to the lower limit value when reaching the upper limit value, and is again exponentially increased, and select which will be generated, the engine-like tone signal or the Shepard tone signal, when generation of the Shepard tone signal is selected, the sound image controller outputs the low frequency waveform signal and the high frequency waveform signal, as they are, from the speakers on the front and rear sides without controlling the low frequency waveform signal and the high frequency waveform signal depending on the positions of the speakers.

5. The active driving sound effect generator according to claim 1, wherein the sound image controller includes an amplifier configured to multiply each of the plurality of signals by a constant for each of the speakers.

* * * * *